(12) United States Patent
Ando et al.

(10) Patent No.: US 10,887,128 B2
(45) Date of Patent: Jan. 5, 2021

(54) IN-VEHICLE NETWORK SYSTEM

(71) Applicant: TOYOTA JIDOSHA KABUSHIKI KAISHA, Toyota (JP)

(72) Inventors: Hiroya Ando, Toyota (JP); Shu Ishizuka, Toyota (JP); Taichi Matsumura, Toyota (JP); Masashi Amesara, Toyota (JP); Yutaka Ueda, Yokkaichi (JP); Yoshifumi Ohmori, Nagoya (JP); Toshio Kawamura, Nagakute (JP); Tomomi Kawamura, Nagakute (JP); Toshio Shimada, Nagoya (JP); Yoshiroh Hirata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 441 days.

(21) Appl. No.: 15/785,585

(22) Filed: Oct. 17, 2017

(65) Prior Publication Data
US 2018/0131538 A1 May 10, 2018

(30) Foreign Application Priority Data

Nov. 7, 2016 (JP) ................................ 2016-217552

(51) Int. Cl.
| | |
|---|---|
| H04L 12/40 | (2006.01) |
| H04L 12/24 | (2006.01) |
| G07C 5/00 | (2006.01) |
| G07C 5/08 | (2006.01) |
| H04L 29/08 | (2006.01) |

(52) U.S. Cl.
CPC ........ *H04L 12/40163* (2013.01); *G07C 5/008* (2013.01); *G07C 5/0808* (2013.01); *H04L 12/40019* (2013.01); *H04L 41/06* (2013.01); *G07C 2205/02* (2013.01); *H04L 67/12* (2013.01)

(58) Field of Classification Search
CPC ........ H04L 12/40143; H04L 12/40019; G07C 5/0841; G07C 5/0808
See application file for complete search history.

(56) References Cited

U.S. PATENT DOCUMENTS

2015/0281022 A1* 10/2015 Harata .................... H04L 12/26
370/242

FOREIGN PATENT DOCUMENTS

| JP | 2014-078800 A | 5/2014 |
| JP | 2016-054367 A | 4/2016 |

\* cited by examiner

*Primary Examiner* — Nam T Tran
(74) *Attorney, Agent, or Firm* — Hunton Andrews Kurth LLP

(57) ABSTRACT

An in-vehicle network system includes a plurality of relay devices that is connected to control devices of a vehicle, and communicates with each other and is configured such that each of a plurality of request devices that transmits a response request to the control device is connected to any one of the relay devices, a storage unit that stores a priority of the request devices, a master setter that sets, as the master, the relay device to which the request device having the highest priority has been connected among the relay devices to which any one of the request devices has been connected, and an arbitrator that performs arbitration to prioritize a response request from the request device having the highest priority when the response requests are transmitted from at least two of the request devices when the relay device in which the arbitrator is included is the master.

19 Claims, 8 Drawing Sheets

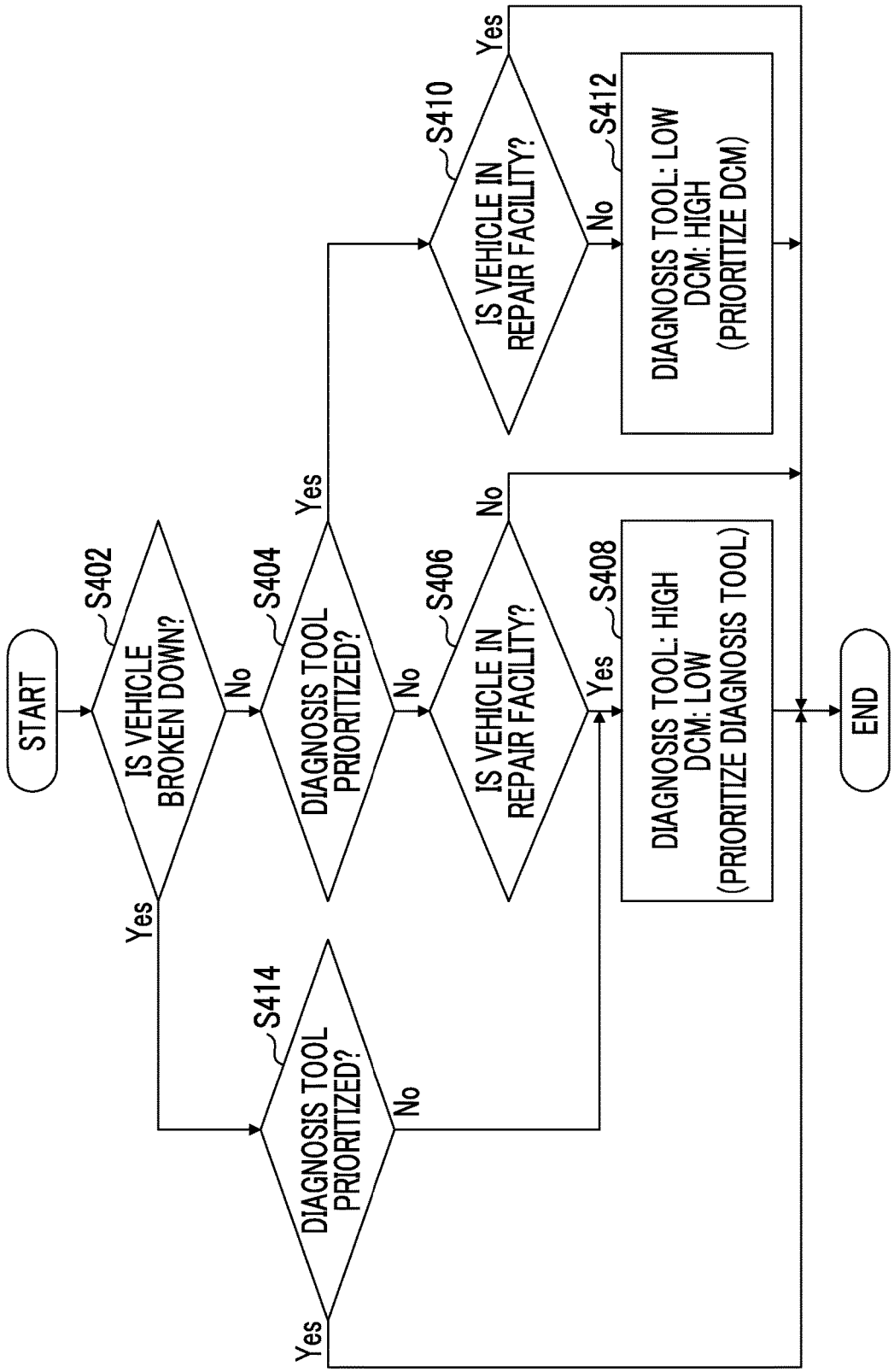

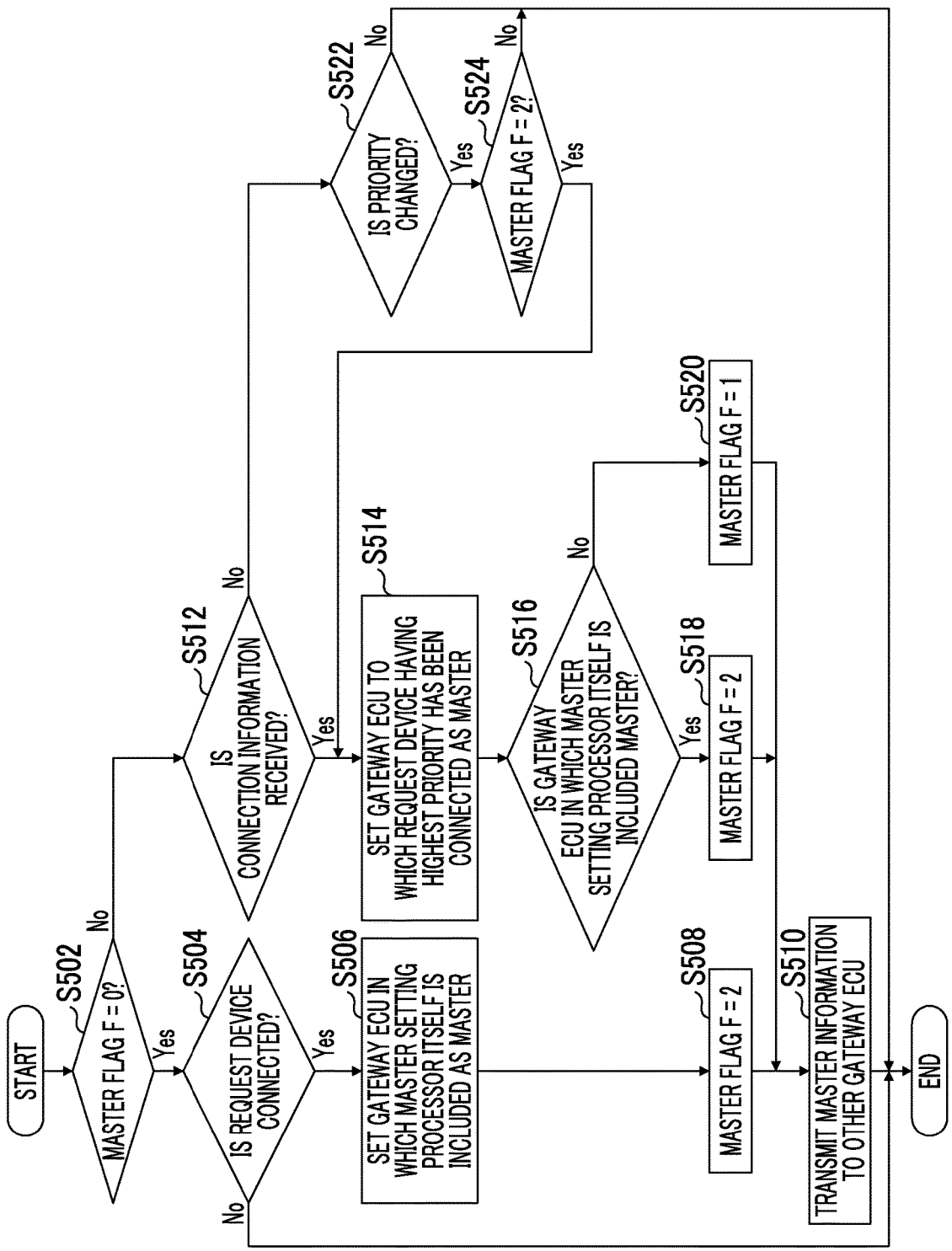

IN-VEHICLE NETWORK SYSTEM

INCORPORATION BY REFERENCE

The disclosure of Japanese Patent Application No. 2016-217552 filed on Nov. 7, 2016 including the specification, drawings and abstract is incorporated herein by reference in its entirety.

BACKGROUND

1. Technical Field

The disclosure relates to an in-vehicle network system.

2. Description of Related Art

An in-vehicle network technology for performing arbitration such as preferentially performing a response to a response request from any one specific device with respect to the same response requests from a plurality of devices to a control device (ECU) is known (for example, Japanese Unexamined Patent Application Publication No. 2014-78800 (JP 2014-78800 A)).

In JP 2014-78800 A, a plurality of local networks (LANs) based on a CAN protocol to which various ECUs belong, a temporarily connectable diagnosis tool, and a DCM (a communication device) capable of receiving a response request from a server are connected to one relay device. The relay device performing arbitration to stop a process regarding a response request from the DCM (a server) when a response request is received from the diagnosis tool is disclosed.

SUMMARY

However, in an in-vehicle network based on an Ethernet (Registered trademark) protocol, a connection configuration in which a plurality of devices is connected in a one-to-one relationship is adopted. Therefore, for example, in order to connect a plurality of local networks to which various ECUs belong to one another, it is needed to perform communication between different local networks by providing a relay device corresponding to each of the local networks and connecting the relay devices in a one-to-one relationship. Further, in vehicles, there may be a large number of physical arrangement specifications of an in-vehicle network, as in a right-hand drive vehicle and a left-hand drive vehicle. Relay devices that are connection destinations of devices that perform a response request directed to ECUs may also be different depending on respective specifications. Accordingly, a method of causing one predetermined relay device among a plurality of relay devices to perform arbitration is likely to be unable to be adopted, as in JP 2014-78800 A.

The disclosure provides an in-vehicle network system capable of appropriately performing arbitration such as preferentially performing a process regarding a response request from any one of a plurality of devices in an in-vehicle network based on an Ethernet protocol, the devices configured to perform response requests directed to various control devices (ECUs).

An aspect of the disclosure relates to an in-vehicle network system mounted on a vehicle. The in-vehicle network system includes a plurality of relay devices, the relay devices being configured to communicate with each other and configured such that a control device of the vehicle is connected to at least one of the relay devices, and each of a plurality of request devices is connected to any predefined one of the relay devices, the request devices being configured to transmit a response request to the control device; a storage unit configured to store priority information indicating a priority of the response request transmitted from each of the request devices; a master setter that sets one of the relay devices as a master, the master setter being configured to set, as the master, the relay device to which the request device having the highest priority has been connected among the relay devices to which any one of the request devices has been connected after a predefined timing, or the relay device to which the request device having the highest priority is connected among the relay devices to which any one of the request devices is connected; and an arbitrator that is included in each of the relay devices, the arbitrator being configured to perform arbitration such that the response request from the request device having the highest priority is preferentially transmitted to the control device when the response requests are transmitted from at least two of the request devices when the relay device in which the arbitrator itself is included is set as the master.

According to the aspect of the disclosure, even when there are the relay devices to which the request devices may be connected as in an in-vehicle network based on an Ethernet protocol, it is possible to automatically set the relay device serving as a master from among the relay devices. Further, even when layouts or the like of the relay devices are different depending on various specifications (for example, a right-hand drive vehicle and a left-hand drive vehicle) of the vehicle, and which request device is connected to which relay device is changed, it is possible to automatically set the request device serving as the master from among the request devices afterwards, that is, after completion of the vehicle. Therefore, the relay device set as the master can appropriately perform an arbitration process regarding the response signals from the request devices.

In the in-vehicle network system of the aspect, the relay devices may include the storage units and the master setters, respectively. Each of the relay devices may further include a first transmitter configured to transmit master information indicating the relay device set as the master to the relay devices other than the relay device in which the first transmitter is included when the master is set by the master setter of the relay device in which the first transmitter is included, a first receiver configured to receive the master information transmitted from the relay devices other than the relay device in which the first receiver is included, a second transmitter configured to transmit connection information regarding the connected request device to the relay devices other than the relay device in which the second transmitter is included when any one of the request devices is connected to the relay device in which the second transmitter is included, and a second receiver configured to receive the connection information transmitted from the relay devices other than the relay device in which the second receiver is included; and each of the master setters may be configured to set the relay device as a master when any one of the request devices is connected to the relay device in which the master setter is included when the master is not set, and set, as the master, the relay device to which the request device having the highest priority has been connected among the relay devices to which any one of the request devices has been connected after a predefined timing, or the relay device to which the request device having the highest priority is connected among the relay devices to which any one of the request devices is actually connected, when any one of the request devices is connected to the relay devices not set as the master when the relay device in which the master setter is included is set as the master.

According to the aspect of the disclosure, when one master setter satisfying a predetermined condition among the master setters included in the relay devices (specifically, the master setter included in the relay device to which any one request device is connected when the master is not set, and the master setter included in the relay device set as the master when the master is set) can perform the setting of the master, it is possible to share the master information regarding the relay device set as the master among the relay devices.

In the in-vehicle network system of the aspect, any one of the relay devices may include the storage unit and the master setter; the one of the relay devices may further include a third receiver configured to receive connection information regarding the connected request device from the relay devices other than the one relay device, and a third transmitter configured to transmit master information regarding the relay device set as the master to the relay devices other than the one relay device when the master is set by the master setter; each of the relay devices other than the one relay device may further include a fourth transmitter configured to transmit the connection information regarding the connected request device to the one relay device when any one of the request devices is connected to the relay device in which the fourth transmitter is included, and a fourth receiver configured to receive the master information that is transmitted from the one relay device; and the master setter may be configured to set, as the master, the relay device to which the request device is connected when any one of the request devices is connected to any one of the relay devices when the master is not set, and set, as the master, the relay device to which the request device having the highest priority has been connected among the relay devices to which any one of the request devices has been connected after the predefined timing, or the relay device to which the request device having the highest priority is connected among the relay devices to which any one of the request devices is connected, when any one of the request devices is connected to the relay devices not set as the master when the master is set.

According to the aspect of the disclosure, it is possible to perform the setting of the master using the master setter included in any of the relay devices, and to share the master information regarding the relay device set as the master among the relay devices.

In the in-vehicle network system of the aspect, an external device that is mounted on the vehicle and communicates with the relay devices may include the storage units and the master setter; the external device may further include a fifth receiver configured to receive connection information regarding the connected request device from each of the relay devices, and a fifth transmitter configured to transmit master information regarding the relay device set as the master to each of the relay devices when the master is set by the master setter; each of the relay devices may further include a sixth transmitter configured to transmit the connection information regarding the connected request device to the external device when any one of the request devices is connected to the relay device in which the sixth transmitter is included, and a sixth receiver configured to receive the master information that is transmitted from the external device; and the master setter may be configured to set, as the master, the relay device to which the request device is connected when any one of the request devices is connected to any one of the relay devices when the master is not set, and set, as the master, the relay device to which the request device having the highest priority has been connected among the relay devices to which any one of the request devices has been connected after the predefined timing, or the relay device to which the request device having the highest priority is connected among the relay devices to which any one of the request devices is connected, when any one of the request devices is connected to the relay devices not set as the master when the master is set.

According to the aspect of the disclosure, it is possible to perform the setting of the master using the master setter included in the external devices that can communicate with a plurality of relay devices, and to share the master information regarding the relay device set as the master among the relay devices.

In the in-vehicle network system of the aspect, the arbitrator may be configured to transmit a command signal to command blocking of communication with the request devices other than the request device connected to the relay device to the relay device not set as the master when the response request is transmitted from the request device connected to the relay device when the relay device in which the arbitrator itself is included is set as the master.

According to the aspect of the disclosure, the arbitrator included in the relay device set as the master, that is, the relay device to which the request device having the highest priority is connected can block communication of a relay device (that is, a slave) not set as the master with another request device when the response request from the request device having the highest priority is transmitted. Therefore, the arbitrator can preferentially transmit (transfer) the response request from the request device with the highest priority to the control device.

In the in-vehicle network system of the aspect, the request devices may include an external connection device that is connectable to any one of the relay devices, and a communication device that is configured to communicate with a server that outputs the response request directed to the control device; and the priority of the external connection device included in the priority information stored in the storage unit may be set to be higher than the priority of the communication device.

According to the aspect of the disclosure, it is possible to prioritize a response request from the external connection device (for example, a diagnosis tool) that is used at a site of inspection or repair of the vehicle as compared with a response request from an external server.

In the in-vehicle network system of the aspect, the in-vehicle network system may further include a priority setter configured to set and change the priority of each of the request devices included in the priority information stored in the storage unit according to the predetermined condition.

According to the aspect of the disclosure, a relative priority (importance) of response requests from a plurality of request devices may be changed according to a position, a state, or the like of the vehicle, and therefore, it is possible to change the priority of each of the request devices in the arbitration process according to the predetermined condition.

In the in-vehicle network system of the aspect, the master setter may be configured to set, as the master, the relay device to which the request device having the highest priority has been connected among the relay devices to which any one of the request devices has been connected after the timing, or the relay device to which the request device having the highest priority is connected among the relay devices to which any one of the request devices is connected, when the priority of each of the request devices is changed by the priority setter when the master is set.

According to the aspect of the disclosure, since a setting of the master is performed at a timing at which the priority is changed, it is possible to appropriately set the relay device that is a master, that is, the relay device that performs the arbitration process according to the change in priority.

In the in-vehicle network system of the aspect, the request devices may include an external connection device that is connectable to any one of the relay devices, and a communication device that is configured to communicate with a server that outputs the response request directed to the control device; and the priority setter may be configured to set the priority of the external connection device to be higher than the priority of the communication device when the priority setter determines that the vehicle is in a repair facility, and set the priority of the communication device to be higher than the priority of the external connection device when the priority setter determines that the vehicle is not in the repair facility.

According to the aspect of the disclosure, when the vehicle is in a repair facility, it is possible to prioritize a response request from the external connection device that is highly likely to be used for inspection and repair. On the other hand, when the vehicle is not in the repair facility, the external connection device is less likely to be connected, and therefore, it is possible to prioritize a response request from a remote server.

In the in-vehicle network system of the aspect, the request devices may include an external connection device that is connectable to any one of the relay devices, and a communication device that is configured to communicate with a server that outputs the response request directed to the control device; and the priority setter may be configured to set the priority of the external connection device to be higher than the priority of the communication device when the vehicle is stopped and the external connection device is connected to any one of the relay devices, and set the priority of the communication device to be higher than the priority of the external connection device when the vehicle is traveling or the external connection device is not connected to any one of the relay devices.

According to the aspect of the disclosure, since it is conceivable that inspection and repair of the vehicle are highly likely to be performed when the vehicle is stopped and an external connection device is connected to the vehicle, a response request from the external connection device is prioritized. On the other hand, since it is conceivable that inspection and repair of the vehicle are less likely to be performed when the vehicle is traveling or when the external connection device is not connected to the vehicle, it is possible to prioritize a response request from a remote server.

In the in-vehicle network system of the aspect, the request devices may include an external connection device that is connectable to any one of the relay devices; and the priority setter may be configured to set the priority of the external connection device to be the highest regardless of the predetermined condition when the priority setter determines that an abnormality has occurred in the vehicle.

According to the aspect of the disclosure, in a situation in which an abnormality has occurred in the vehicle and repair is needed, it is possible to prioritize the response request from the external connection device that is used for repair and inspection of the vehicle.

According to the aspect of the disclosure, it is possible to provide an in-vehicle network system capable of appropriately performing arbitration such as preferentially performing a process regarding a response request from any one of a plurality of devices that performs response requests directed to various control units (ECUs) in an in-vehicle network based on an Ethernet protocol.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart schematically illustrating still another example of the priority setting process in the gateway ECU (the priority setter) according to the second embodiment; and FIG. 8 is a flowchart schematically illustrating an example of a master setting process in the gateway ECU (a master setter) according to the second embodiment.

DETAILED DESCRIPTION OF EMBODIMENTS

Hereinafter, embodiments will be described with reference to the drawings.

First Embodiment

First, a basic configuration of the in-vehicle network system 1 according to the embodiment will be described with reference to FIG. 1.

Figure 1:
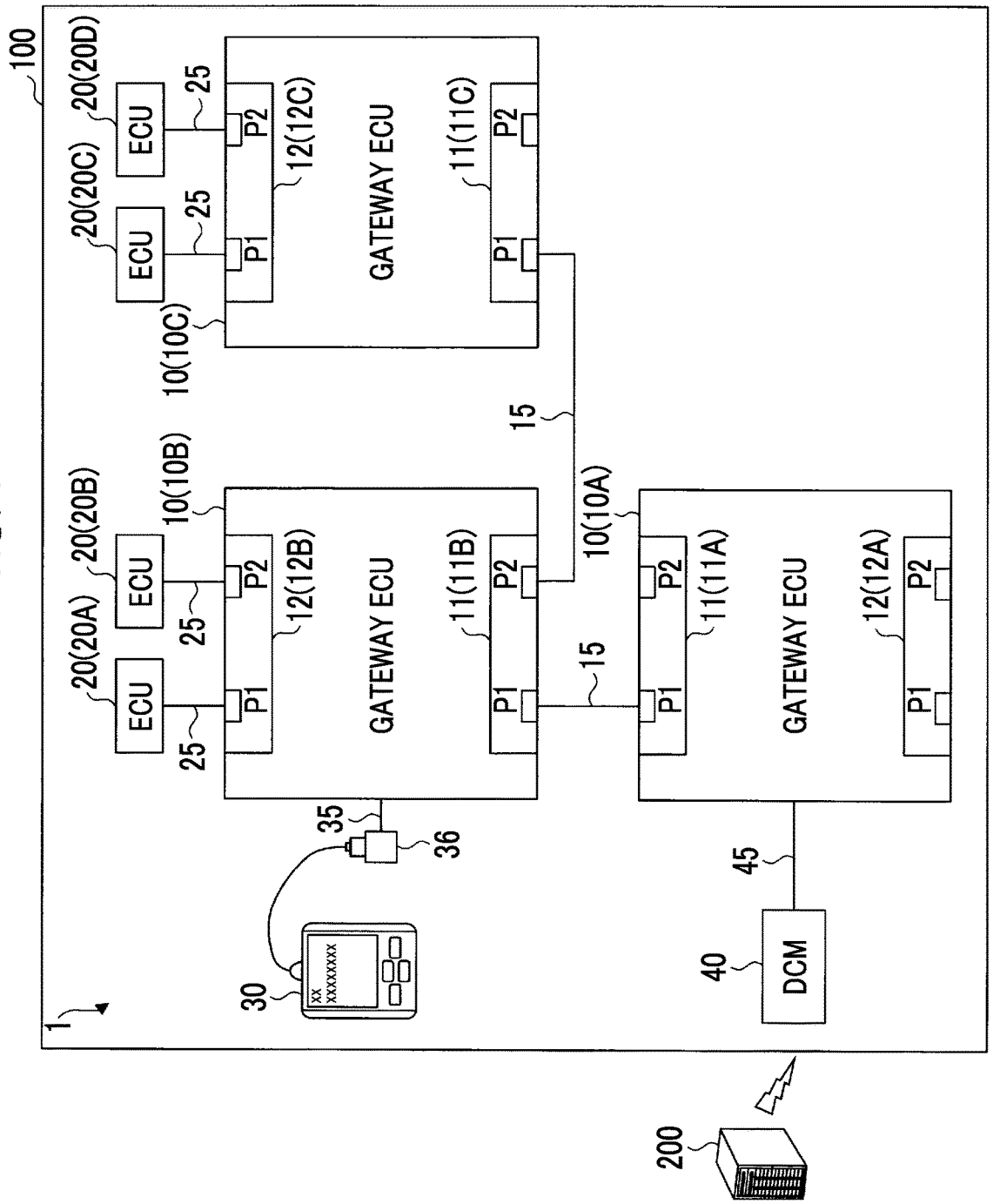
FIG. 1 is a diagram schematically illustrating an example of a configuration of an in-vehicle network system.

FIG. 1 is a diagram schematically illustrating an example of a configuration of an in-vehicle network system 1 according to the embodiment. The in-vehicle network system 1 according to the embodiment is mounted on a vehicle 100, builds an in-vehicle network based on an Ethernet protocol, and includes a plurality of (three in the example) gateway electronic control units (ECUs) 10, the ECUs 10 being configured to communicate with each other; a plurality of (four in the example) ECUs 20 that performs various controls of the vehicle; a diagnosis tool 30; and a data communication module (DCM) 40.

The gateway ECU 10 (an example of a relay device) relays communication between different local networks or between a device (the diagnosis tool 30, the DCM 40) that performs a response request directed to the ECU 20 and a local network to which the ECU 20 belongs. Any one of the local network to which the ECU 20 belongs and the device (the diagnosis tool 30 or the DCM 40) that performs a response request directed to the ECU 20 is connected to the gateway ECU 10. The gateway ECU 10 includes a layer 3 (L3) switch 11 for connecting to the gateway ECUs 10 corresponding to other local networks via a communication line 15, and a layer 2 (L2) switch 12 for connecting to the ECU 20 that constitutes the local network including the gateway ECU 10 itself via a communication line 25. The gateway ECU 10 includes three gateway ECUs 10A to 10C, and the L3 switch 11 and the L2 switch 12 include L3 switches 11A to 11C and L2 switches 12A to 12C corresponding to the gateway ECUs 10A to 10C, respectively.

The gateway ECU 10A is connected to the DCM 40 via a dedicated communication line 45. Further, the gateway ECU 10A is connected to the gateway ECU 10B via the communication line 15 connected to the port P1 of the L3 switch 11A. That is, the gateway ECU 10A relays communication between the DCM 40 and (other local networks including) the ECU 20 connected to the other gateway ECUs 10 (the gateway ECUs 10B, 10C) or the diagnosis tool 30.

The DCM 40 may be connected to any one of the ports P1, P2 of the L2 switch 12A via the communication line 25, and constitute the local network based on an Ethernet protocol together with the gateway ECU 10A. Further, another ECU 20 may be connected to the port P1, P2 of the L2 switch 12A of the gateway ECU 10A via the communication line 25, and constitute a local network based on the Ethernet protocol, which includes the gateway ECU 10A and the ECU 20.

The gateway ECU 10B is configured such that the gateway ECU 10B is connectable to the diagnosis tool 30 via a dedicated communication line 35. Specifically, a first end of the communication line 35 is connected to a predetermined interface of the gateway ECU 10B, and a connector 36 is provided at a second end of the communication line 35. A connector (not illustrated) provided at a distal end of a connection code of the diagnosis tool 30 is connected to the connector 36, and therefore, the gateway ECU 10B and the diagnosis tool 30 are communicatively connected to each other. Further, the gateway ECU 10B is connected to the gateway ECUs 10A, 10C via the communication lines 15 connected to the respective ports P1, P2 of the L3 switch 11B. Further, the gateway ECU 10B is connected to the ECUs 20 (ECUs 20A, 20B) via the communication lines 25 connected to the respective ports P1, P2 of the L2 switch 12B, and constitutes a local network based on the Ethernet protocol including the ECUs 20A, 20B. That is, the gateway ECU 10B relays communication between the diagnosis tool 30 and (the local network including) the ECU 20 connected to the other gateway ECU 10 (10A, 10C). Further, the gateway ECU 10B relays communication between the diagnosis tool 30 and (the local network including) the ECUs 20A, 20B connected to the gateway ECU 10B. Further, the gateway ECU 10B relays communication between the local network including the ECUs 20A, 20B and (another local network including) the ECU 20 connected to the other gateway ECU 10 (the gateway ECU 10C) or the DCM 40.

The number of the ECUs 20 constituting the local network together with the gateway ECU 10B is not limited to two, and may be one or may be three or more. For example, in a case where there is another port other than the ports P1, P2 of the L2 switch 12B, the ECU 20 may further be connected to the other port via the communication line 25. Further, one port of the other L2 switch, instead of the ECU 20, may be connected to at least one of ports P1, P2 of the L2 switch 12B via the communication line 25, and the ECU 20 may be connected to each of a plurality of other ports of the L2 switch via the communication line 25. The same connection as described above applies to a gateway ECU 10C that will be described below. Further, the diagnosis tool 30 may be connected to another port other than the ports P1, P2 of the L2 switch 12A via the communication line 25, and constitute the local network based on the Ethernet protocol together with the gateway ECU 10B and the ECUs 20A, 20B.

The gateway ECU 10C is connected to the gateway ECU 10B via the communication line 15 connected to a port P1 of the L3 switch 11C. Further, the gateway ECU 10C is connected to the ECUs 20 (ECUs 20C, 20D) via communication lines 25 connected to the respective ports P1, P2 of the L2 switch 12C. That is, the gateway ECU 10C relays communication between a local network including the ECUs 20C, 20D and (the other local network including) the ECU 20 connected to the other gateway ECU 10 (10A, 10B), the diagnosis tool 30, or the DCM 40.

The ECU 20 is an electronic control unit that performs control of the vehicle 100 (for example, an in-vehicle device mounted on the vehicle 100). Examples of the ECU 20 include various ECUs such as an engine ECU, a transmission ECU, an air conditioner ECU, a brake ECU, a power steering ECU, a meter ECU, a navigation ECU, and a body ECU. The ECU 20 may be mainly configured as, for example, a microcomputer including a CPU, a RAM, a ROM, and an I/O, and can realize various control processes by executing various programs stored in the ROM on the CPU. Further, for example, the ECU 20 has a self-diagnostic function, and performs a process of causing data such as a detection value of the sensor at the time of occurrence of the abnormality, or a control signal directed to the in-vehicle device or the actuator to be stored in an internal memory in a case where an abnormality has occurred in, for example, an in-vehicle device, an actuator, a sensor that are control targets. Further, for example, when a predetermined event (for example, sudden braking performed by a driver, or activation of Anti-Lock Braking System (ABS)) occurs in the vehicle 100, the ECU 20 performs a process of storing a detection value of a specific sensor, control signals from various ECUs, or the like predefined to correspond to the event in an internal memory. The ECU 20 includes the ECUs 20A, 20B connected to the L2 switch 12B of the gateway ECU 10B, and the ECUs 20C, 20D connected to the L2 switch 12C of the gateway ECU 10C, as described above.

Although the ECUs 20 are connected to the gateway ECUs 10 (10B, 10C) in the embodiment, the ECUs 20 may be connected to solely one gateway ECU 10 (for example, the gateway ECU 10C) or may be connected to three or more gateway ECUs 10 (for example, the gateway ECU 10A in addition to the gateway ECUs 10B, 10C as described above). That is, the ECUs 20 may be connected to at least one of the gateway ECUs 10.

The diagnosis tool 30 (an example of a request device) is an example of an external connection device that is connectable to the in-vehicle network system 1 (specifically, the gateway ECU 10) of the vehicle 100. Specifically, the diagnosis tool 30 is temporarily connected to the in-vehicle network system 1 of the vehicle 100 and performs a process regarding failure diagnosis of the vehicle 100. The diagnosis tool 30 is connected to the predefined gateway ECU among the gateway ECUs 10 (the gateway ECUs 10A to 10C). In the embodiment, a connection code having a connector at a distal end thereof is included, and can be coupled to the connector 36 provided at a distal end of the dedicated communication line 35 connected to the gateway ECU 10B, as described above. The diagnosis tool 30 is connected to the gateway ECU 10B via the connector 36 and the communication line 35 such that the diagnosis tool 30 can transmit the response request directed to the ECU 20 (ECUs 20A to 20D) via the gateway ECU 10B.

The DCM 40 (another example of the request device) is a communication device that performs bi-directional communication with a center server 200 remotely provided in the vehicle 100 via a wireless communication line (for example, a mobile phone network). The DCM 40 is connected to a predefined one of the gateway ECUs 10 (the gateway ECUs 10A to 10C), similar to the diagnosis tool 30. In the embodiment, the DCM 40 is connected to the gateway ECU 10A, and transmits a response request to the ECU 20 (ECUs 20A to 20D) via the gateway ECU 10A according to the request signal (that is, a response request directed to the ECU of the vehicle 100) that is transmitted from the center server 200. The center server 200 may perform, for example, analysis of the causes of abnormality or failure of the vehicle 100, analysis of a situation of occurrence of an abnormal operation of the vehicle 100, or the like based on various pieces of data (failure diagnosis data or log data) that are received from the ECU 20 via the DCM 40. A response signal transmitted from the DCM 40 includes a response signal of the same content or the same type as the response signal that is transmitted from the diagnosis tool 30. The response request of the same content or the same type transmitted from both of the diagnosis tool 30 and the DCM 40 may be a data readout request directed to the ECU 20 and may include, for example, a readout request for data (such as Freezed Frame Data (FFD)) regarding failure diagnosis, and a readout request for log data of detection signals of sensors or control signals of various ECUs at the time of occurrence of a predetermined event. Further, the response request of the same content or the same type transmitted from both of the diagnosis tool 30 and the DCM 40 may be a data rewrite request and may be, for example, an update request (a reprogramming request or a rewrite request) for various programs installed in the ECU 20.

Although request devices that transmit the response request of the same content or the same type directed to the ECU 20 are two devices including the diagnosis tool 30 and the DCM 40 in the embodiment, the number of request devices may be three or more. For example, the request device to be added may be a consumer tool, a reprogramming tool, a personal computer, a portable terminal (such as a smartphone) different from the genuine diagnosis tool 30 manufactured by a manufacturer of the vehicle 100, and may be connected to predefined one (for example, the gateway ECU 10C) of the gateway ECUs 10A to 10C. In this case, the request device to be added may be an aspect that is temporarily connected to the gateway ECU 10 like the diagnosis tool 30 or may be an aspect that is constantly connectable to the gateway ECU 10, like the DCM 40. That is, the request device may be connectable to any predefined one of the gateway ECUs 10A to 10C.

Next, a functional configuration of the gateway ECU 10 (10A to 10C) will be the described with reference to FIG. 2.

Figure 2:
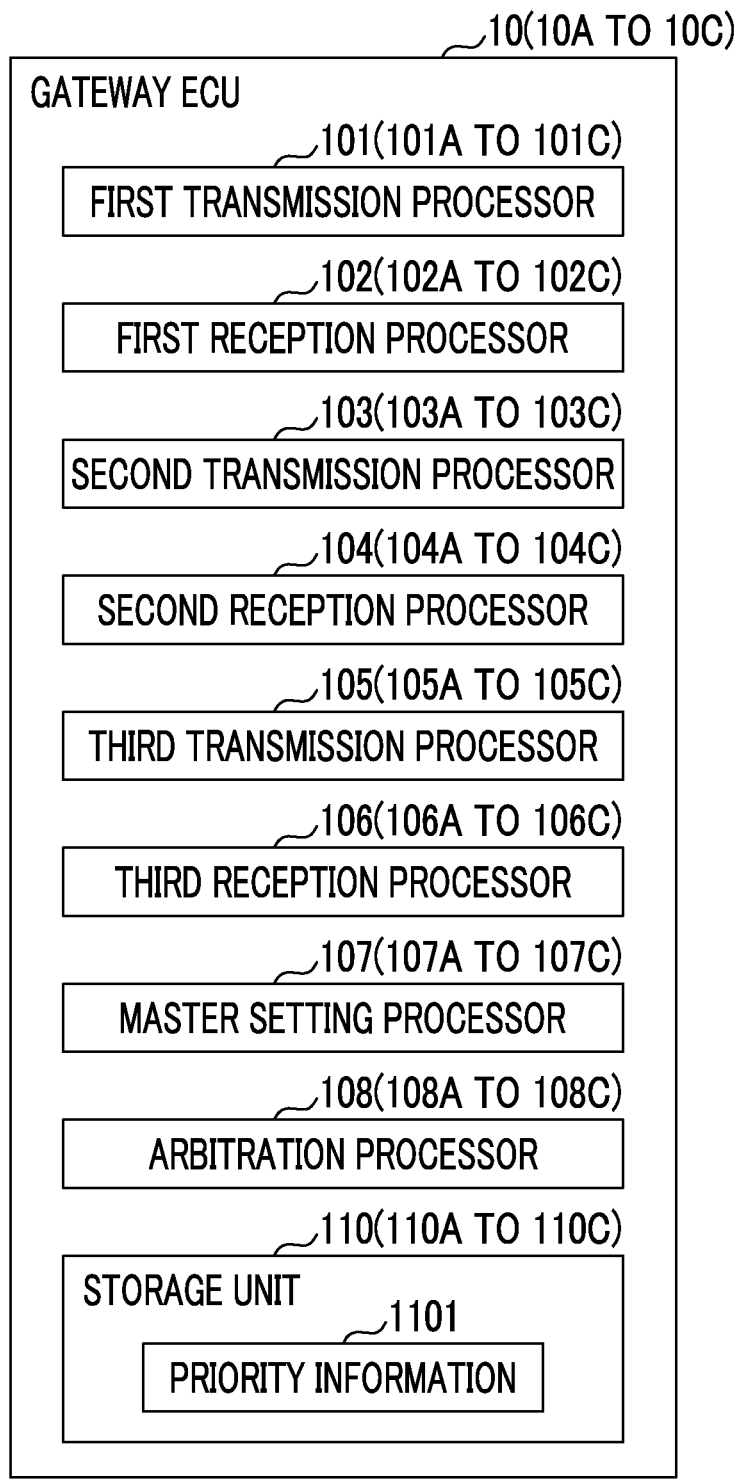
FIG. 2 is a functional block diagram illustrating an example of a configuration of a gateway ECU according to a first embodiment.

FIG. 2 is a functional block diagram illustrating an example of a configuration of the gateway ECU 10 (10A to 10C) according to the embodiment.

Each of the gateway ECUs 10, that is, the gateway ECUs 10A to 10C may include the same hardware and the same function (software). That is, the gateway ECUs 10A to 10C are solely different in connection places inside the in-vehicle network system 1 and in layout places in the vehicle 100, and may be hardware having the same function. Accordingly, an increase in the number of types of components can be suppressed, and therefore, component cost of the gateway ECU 10 can be reduced. Hereinafter, description will be given on the assumption that all of the gateway ECUs 10 have the same function.

The gateway ECU 10 may have a function that may be realized by arbitrary hardware, software, or a combination of the hardware and the software and may mainly include, for example, a microcomputer including a CPU, a RAM, a ROM, and an I/O, similar to the ECU 20. The gateway ECU 10 includes a first transmission processor 101, a first reception processor 102, a second transmission processor 103, a second reception processor 104, a third transmission processor 105, a third reception processor 106, a master setting processor 107, and an arbitration processor 108 as functional units that are realized by executing various programs stored in the ROM on the CPU, as illustrated in FIG. 2. Further, the gateway ECU 10 includes, for example, a storage unit 110 as a storage area that is defined in a non-volatile internal memory such as an electrically erasable programmable read only memory (EEPROM). Further, the first transmission processor 101, the first reception processor 102, the second transmission processor 103, the second reception processor 104, the third transmission processor 105, the third reception processor 106, the master setting processor 107, the arbitration processor 108, and the storage unit 110 include first transmission processors 101A to 101C, first reception processors 102A to 102C, second transmission processors 103A to 103C, second reception processors 104A to 104C, third transmission processors 105A to 105C, third reception processors 106A to 106C, master setting processors 107A to 107C, arbitration processors 108A to 108C, and storage units 110A to 110C corresponding to the gateway ECUs 10A to 10C, respectively.

The first transmission processor 101 (an example of a first transmitter and a second transmitter) performs a process of transmitting a signal to the gateway ECU 10 other than the gateway ECU 10 in which the first transmission processor 101 itself is included, via the L3 switch 11. For example, when the gateway ECU 10 in which the first transmission processor 101 (101B) itself is included is not set as a master which will be described below, the first transmission processor 101 (101B) transmits connection information indicating that the request device (diagnosis tool 30) is connected to the gateway ECU 10 (10B) in which the request device itself is included, to the gateway ECU 10 set as a master. Whether or not the gateway ECU 10 in which the request device itself is included is a master can be recognized based on the value of the master flag F, which will be described below. Further, for example, the first transmission processor 101 (101A, 101B) transmits (transfers) a response request directed to the ECU 20 that is connected to the gateway ECU 10 other than the gateway ECU 10 in which the first transmission processor 101 (101A, 101B) itself is included, from the request device (the diagnosis tool 30 or the DCM 40) to the other gateway ECU 10 to which the ECU 20 that is the destination is connected.

The first reception processor 102 (an example of a first receiver and a second receiver) performs a process of receiving a signal transmitted from the other gateway ECU 10, via the L3 switch 11. For example, the first reception processor 102 receives the response request from the request device (the diagnosis tool 30 or the DCM 40), which is transmitted (transferred) from the gateway ECU 10 other than the gateway ECU 10 in which the first reception processor 102 itself is included. Further, for example, the first reception processor 102 receives master information to be described below from the gateway ECU 10 other than the gateway ECU 10 in which the first reception processor 102 itself is included. Further, for example, the first reception processor 102 receives the connection information from the gateway ECU 10 other than the gateway ECU 10 in which the first reception processor 102 itself is included, in a case where the gateway ECU 10 in which the first reception processor 102 itself is included is set as a master.

The second transmission processor 103 performs a process of transmitting a signal to the ECU 20 connected to the gateway ECU 10 in which the second transmission processor 103 itself is included (that is, the local network including the gateway ECU 10 in which the second transmission processor 103 itself is included) via the L2 switch 12. For example, the second transmission processor 103 (103B, 103C) transmits (transfers), to the ECU 20 that is a target, a response request from the request device (the diagnosis tool 30 or the DCM 40) directed to the ECU 20 that is connected to the gateway ECU 10 in which the second transmission processor 103 itself is included.

The second reception processor 104 performs a process of receiving a signal that is transmitted from the ECU 20 (that is, the local network) that is connected to the gateway ECU 10 in which the second reception processor 104 itself is included, via the L2 switch 12. For example, the second reception processor 104 (104B, 104C) receives a response signal that is transmitted from the ECU 20 of the local network in response to the response request from the request device (the diagnosis tool 30 or the DCM 40).

The third transmission processor 105 performs a process of transmitting a signal (for example, a response signal replied from the ECU 20 in response to the response request) to the request device connected to the gateway ECU 10 in which the third transmission processor 105 itself is included.

The third reception processor 106 performs a process of receiving a signal (response request) from a request device that is connected to the gateway ECU 10 in which the third reception processor 106 itself is included.

The master setting processor 107 (an example of a master setter) performs a process of setting one master from among the gateway ECUs 10A to 10C based on a connection situation (connection history) of connection of the request device to the gateway ECU 10 after a predefined timing (for example, at the time of completion of the vehicle 100 or at the time of ignition on (IG-ON) of the vehicle 100). Further, in a case where the master setting processor 107 sets the master from among the gateway ECUs 10A to 10C, the master setting processor 107 sends, to the first transmission processor 101, a transmission request for transmitting master information regarding the gateway ECU 10 set as a master to the gateway ECU 10 other than the gateway ECU 10 in which the master setting processor 107 itself is included. Thus, the other gateway ECU 10 can recognize the gateway ECU 10 set as a master.

The master is not set at the above timing (for example, at the time of completion of the vehicle 100 or at the time of IG-ON of the vehicle 100) (that is, the master flag F is an initial state "0"), and the master setting processor 107 sets the gateway ECU 10 in which the master setting processor 107 itself is included as a master when the request device is connected to the gateway ECU 10 in which the master setting processor 107 itself is included in a case where the master is not set. As described above, the diagnosis tool 30 is a temporarily connectable aspect, whereas the DCM 40 is constantly connected. Therefore, when the vehicle 100 is IG-ON in a state in which the master is not set, the master setting processor 107A of the gateway ECU 10A determines that the DCM 40 is connected to the gateway ECU 10A, and sets the gateway ECU 10A as the master. The master setting processor 107 (107A) sends, to the first transmission processor 101 (101A), a transmission request for transmitting master information indicating that the gateway ECU 10 (10A) in which the master setting processor 107 (107A) itself is included is set as a master to the other gateway ECU 10 (10B, 10C).

Further, when the first reception processor 102 receives the connection information indicating that the request device is connected, from the gateway ECU 10 other than the gateway ECU 10 in which the master setting processor 107 itself is included in a case where the gateway ECU 10 in which the master setting processor 107 itself is included is set as a master, the master setting processor 107 performs setting of the master based on priority information 1101 stored in the storage unit 110. The priority information 1101 is information indicating a priority in an arbitration process for the response request that is transmitted from each of the request devices (the diagnosis tool 30 or the DCM 40). A priority of each of the request devices is defined in the priority information 1101. Specifically, the master setting processor 107 sets, as the master, the gateway ECU 10 to which the request device having the highest priority that is defined in the priority information 1101 has been connected among the gateway ECUs 10 (10A to 10C) to which the request devices (the diagnosis tool 30 or the DCM 40) has been connected since the above timing. As described above, the diagnosis tool 30 is an aspect that is temporarily connectable to the gateway ECU 10B. Therefore, at a repair facility (a dealer, a service factory, or the like) for the vehicle 100, when the diagnosis tool 30 is connected for the first time since the above timing, the gateway ECU 10A (the first reception processor 102A) set as the master receives the connection information indicating that the diagnosis tool 30 is connected from the gateway ECU 10B. The master setting processor 107A of the gateway ECU 10A sets, as the master, the gateway ECU 10 (any one of the gateway ECUs 10A, 10B) to which the diagnosis tool 30 or the DCM 40 having a relatively high priority defined in the priority information 1101 has been connected. In the embodiment, the priority of the diagnosis tool 30 is set to be higher than the priority of the DCM 40 in the priority information 1101. This is because it is conceivable that a response request at a site at which inspection and repair of the vehicle 100 are actually performed is prioritized as compared with a request from the center server 200 since the diagnosis tool 30 is usually used for inspection and repair of the vehicle 100. Therefore, the master setting processor 107A of the gateway ECU 10A sets the gateway ECU 10B to which the diagnosis tool 30 having the highest priority has been connected, as a master. The master setting processor 107 (107A) sends, to the first transmission processor 101 (101A), a transmission request for transmitting the master information indicating that the gateway ECU 10B is set as the master to the other gateway ECU 10 (10B, 10C).

Thus, in the embodiment, the master setting is performed at a timing at which the request device (the diagnosis tool 30 or the DCM 40) is connected to any one of the gateway ECUs 10. Therefore, the master setting can be appropriately performed according to a connection situation between the gateway ECUs 10A to 10C and a plurality of request devices (the diagnosis tool 30, the DCM 40).

In the embodiment, for the priority defined in the priority information 1101, for example, two types including "high" indicating that the priority is relatively higher and "low" indicating that the priority is relatively lower are provided. The diagnosis tool 30 is set to "high", and the DCM 40 is set to "low". Further, in a case where three or more of request devices are provided, a multi-step priority is provided (for example, for three request devices, "medium" indicating a medium priority is provided).

Further, the master setting processor 107 performs management of a master flag F indicating whether or not the master is set and whether or not the gateway ECU 10 in which the master setting processor 107 itself is included is the master when the master is set (F=0: master is not set, F=1: a gateway ECU other than the gateway ECU 10 in which the master setting processor 107 itself is included is a master, and F=2: the gateway ECU 10 in which the master setting processor 107 itself is included is a master). The master flag F is stored in the storage unit 110, and an initial value thereof is "0" indicating that the master has not been set. The master flag F is updated each time the master is set. Specifically, the master setting processor 107 updates the master flag F stored in the storage unit 110 when the master setting processor 107 itself has set the master or when first reception processor 102 of the gateway ECU 10 in which the master setting processor 107 itself is included has received the master information from the other gateway ECU 10.

The process of the master setting processor 107 will be further described in detail below.

The arbitration processor 108 (an example of the arbitrator) performs an arbitration process such that the response request from the request device (the diagnosis tool 30) having the highest priority defined in the priority information 1101 among response requests from at least two request devices (the diagnosis tool 30, the DCM 40) is preferentially transmitted to the ECU 20 in a case where the gateway ECU 10 in which the arbitration processor 108 itself is included is set as the master. Thus, for example, response requests of the same content or the same type are transmitted to the same ECU 20 at very close timings, such that a situation adversely affecting the process of the ECU 20 can be suppressed. Specifically, adverse effects such as confusion caused in the process of the ECU 20 by receiving a plurality of response requests of the same content or disabling of a determination as to how a response signal according to each content is to be replied by receiving a plurality of the same type of response requests can be suppressed. For example, as described above, in a case where the diagnosis tool 30 is connected and the gateway ECU 10B is set as the master, the arbitration processor 108B of the gateway ECU 10B sends, to the first transmission processor 101B, a transmission request for transmitting a command signal to command blocking of communication regarding the same response request with the DCM 40 to the gateway ECU 10A when the third reception processor 106 receives the response request from the diagnosis tool 30. Accordingly, since the gateway ECU 10A blocks the communication regarding the response request directed to the ECU 20 with the DCM 40 according to the command signal transmitted from the first transmission processor 101B, solely the response request from the diagnosis tool 30 is preferentially transmitted to the ECU 20.

Next, a specific process flow in the master setting processor 107 according to the embodiment will be described with reference to FIG. 3.

Figure 3:
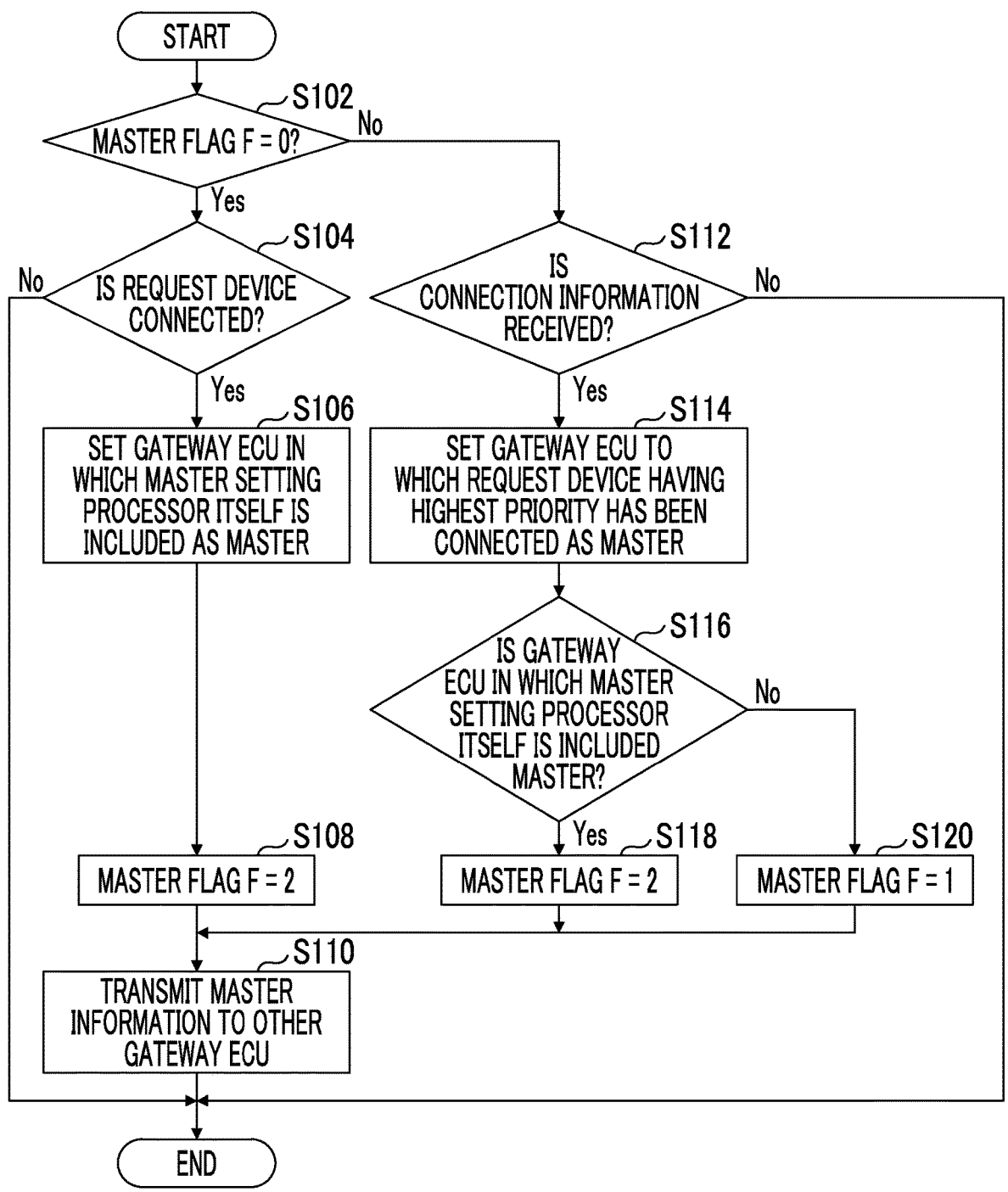
FIG. 3 is a flowchart schematically illustrating an example of a master setting process in the gateway ECU (a master setter) according to the first embodiment.

FIG. 3 is a flowchart schematically illustrating an example of the master setting process in the master setting processor 107. A process in the flowchart may be periodically executed, for example, during an operation of the gateway ECU 10 in which the master setting processor 107 that is a processing target is included (for example, between IG-ON and IG-OFF of the vehicle 100).

In step S102, the master setting processor 107 determines whether or not the master flag F is "0", that is, whether or not the master is set. The master setting processor 107 proceeds to step S104 when the master flag F is 0, and proceeds to step S112 when the master flag F is not 0 (the master flag F is "1" or "2").

In step S104, the master setting processor 107 determines whether or not the request device is connected to the gateway ECU 10 in which the master setting processor 107 itself is included. The master setting processor 107 proceeds to step S106 when the request device is connected, and ends the current process when the request device has not been connected.

In step S106, the master setting processor 107 sets the gateway ECU 10 in which the master setting processor 107 itself is included as a master.

In step S108, the master setting processor 107 updates the master flag F to "2".

In step S110, the master setting processor 107 transmits the master information regarding the gateway ECU 10 set as the master to the gateway ECU 10 other than the gateway ECU 10 in which the master setting processor 107 itself is included via the first transmission processor 101, and ends the current process.

On the other hand, in step S112, the master setting processor 107 determines whether or not the first reception processor 102 has received the connection information indicating that the request device is connected, from the gateway ECU 10 other than the gateway ECU 10 in which the master setting processor 107 itself is included. The master setting processor 107 proceeds to step S114 when the first reception processor 102 has received the connection information, and ends the current process when the first reception processor 102 has not received the connection information.

As described above, the connection information is transmitted from (the first transmission processor 101 of) the gateway ECU 10 not set as the master to the gateway ECU 10 set as the master. Therefore, the gateway ECU 10 including the first reception processor 102 which has received the connection information is set as the master.

In step S114, the master setting processor 107 sets, as the master, the gateway ECU 10 to which the request device having the highest priority defined in the priority information 1101 has been connected among the gateway ECUs 10 to which any one of a plurality of request devices has been connected since the above timing (the time of completion of the vehicle 100 or the time of IG-ON of the vehicle 100).

In step S116, the master setting processor 107 determines whether or not the gateway ECU 10 in which the master setting processor 107 itself is included is set as a master. The master setting processor 107 proceeds to step S118 when the gateway ECU 10 in which the master setting processor 107 itself is included is set as a master, and proceeds to step S120 when the gateway ECU 10 in which the master setting processor 107 itself is included is not set as a master.

In step S118, the master setting processor 107 sets (updates) the master flag F2 to "2" and proceeds to step S110.

On the other hand, in step S120, the master setting processor 107 sets (updates) the master flag F2 to "1" and proceeds to step S110.

As described above, the master setting processor 107 performs setting (updating) of the master flag F even in a case where the gateway ECU 10 (the first reception processor 102) in which the master setting processor 107 itself is included is received the master information from the other gateway ECU 10, in addition to the process according to the present flow.

In step S110, the master setting processor 107 transmits the master information regarding the gateway ECU 10 set as the master to the gateway ECU 10 other than the gateway ECU 10 in which the master setting processor 107 itself is included via the first transmission processor 101, and ends the current process.

Thus, in the embodiment, the in-vehicle network system (the master setting processor 107) sets, as the master, the gateway ECU 10 to which the request device having the highest priority defined in the priority information 1101 has been connected among the gateway ECUs 10 to which any one of the request devices (the diagnosis tool 30, the DCM 40) has been connected after the predefined timing (the time of completion of the vehicle 100 or the time of IG-ON of the vehicle 100). In a case where the gateway ECU 10 (the arbitration processor 108) is set as the master, the gateway ECU 10 (the arbitration processor 108) performs arbitration such that the response request from the request device having the highest priority is preferentially transmitted to the ECU 20 when the response request is transmitted from at least two of the request devices. Accordingly, even in a case where there is a plurality of gateway ECUs 10 to which a plurality of request devices is connectable as in an in-vehicle network based on an Ethernet protocol, it is possible to automatically set the gateway ECU 10 that is the master from among the gateway ECUs 10. Further, even in a case where layouts or the like of the gateway ECUs 10 are different depending on various specifications (for example, a right-hand drive vehicle and a left-hand drive vehicle) of the vehicle 100, and which request device is changed to which gateway ECU 10 is changed, the gateway ECU 10 serving as the master can be automatically set from among the gateway ECUs 10 afterwards (after completion of the vehicle 100). Therefore, the gateway ECU 10 set as the master can appropriately perform an arbitration process regarding the response signals from the request devices. Further, the request device having the highest priority in the arbitration process among the request devices is connected to the gateway ECU 10 set as the master. Therefore, an arbitration process corresponding to a response request from the request device having the highest priority is easily performed.

Second Embodiment

Next, a second embodiment will be described.

An in-vehicle network system 1 according to the second embodiment is mainly different from that according to the first embodiment in that a gateway ECU 10 further includes a priority setting processor 109 (see FIG. 4) (an example of the priority setter). Hereinafter, components that are the same as or correspond to those in the first embodiment are denoted by the same reference numerals and portions different from those in the first embodiment will be mainly described.

Figure 4:
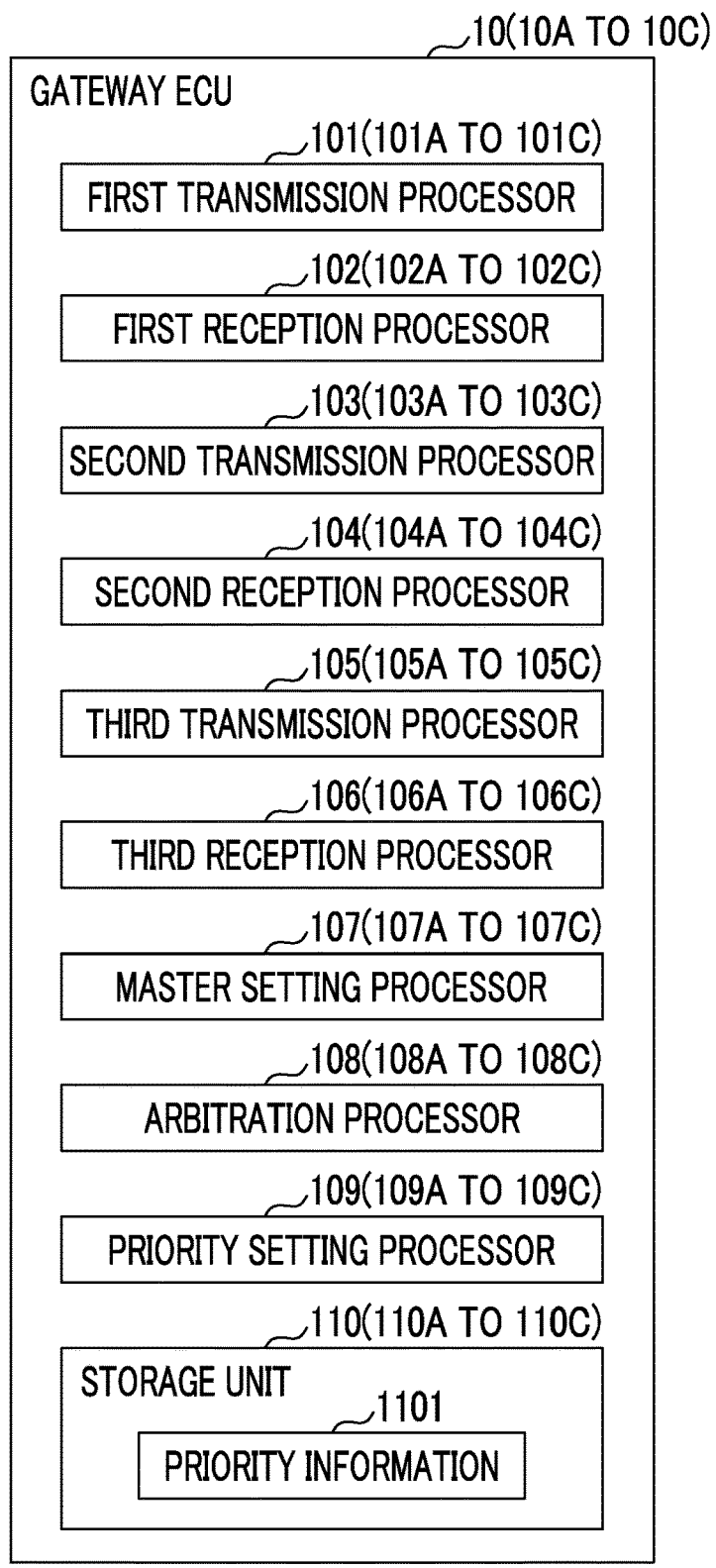
FIG. 4 is a functional block diagram illustrating an example of a configuration of a gateway ECU according to a second embodiment.

FIG. 4 is a functional block diagram illustrating an example of a configuration of the gateway ECU 10 according to the embodiment.

The gateway ECU 10 includes a first transmission processor 101, a first reception processor 102, a second transmission processor 103, a second reception processor 104, a third transmission processor 105, a third reception processor 106, a master setting processor 107, an arbitration processor 108, and a priority setting processor 109 as functional units that are realized by executing various programs stored in a ROM on a CPU, as illustrated in FIG. 4. Further, the gateway ECU 10 includes, for example, a storage unit 110 as a storage area that is defined in a non-volatile internal memory such as an EEPROM. Further, the first transmission processor 101, the first reception processor 102, the second transmission processor 103, the second reception processor 104, the third transmission processor 105, the third reception processor 106, the master setting processor 107, the arbitration processor 108, the priority setting processor 109, and the storage unit 110 include first transmission processors 101A to 101C, first reception processors 102A to 102C, second transmission processors 103A to 103C, second reception processors 104A to 104C, third transmission processors 105A to 105C, third reception processors 106A to 106C, master setting processors 107A to 107C, arbitration processors 108A to 108C, priority setting processor 109A to 109C, and storage units 110A to 110C corresponding to the gateway ECUs 10A to 10C, respectively.

The master setting processor 107 performs a master setting process in a case where a priority of each of a plurality of request devices (a diagnosis tool 30 and a DCM 40) defined in priority information 1101 by the priority setting processor 109 is changed, in addition to the timing shown in the first embodiment. Details will be described below.

The priority setting processor 109 sets and changes the priority of each of the request devices (the diagnosis tool 30, the DCM 40) defined in the priority information 1101 according to a position, a state (vehicle state), or the like of the vehicle 100. Hereinafter, a priority setting process in the priority setting processor 109 will be described with reference to FIGS. 5 to 7.

Figure 5:
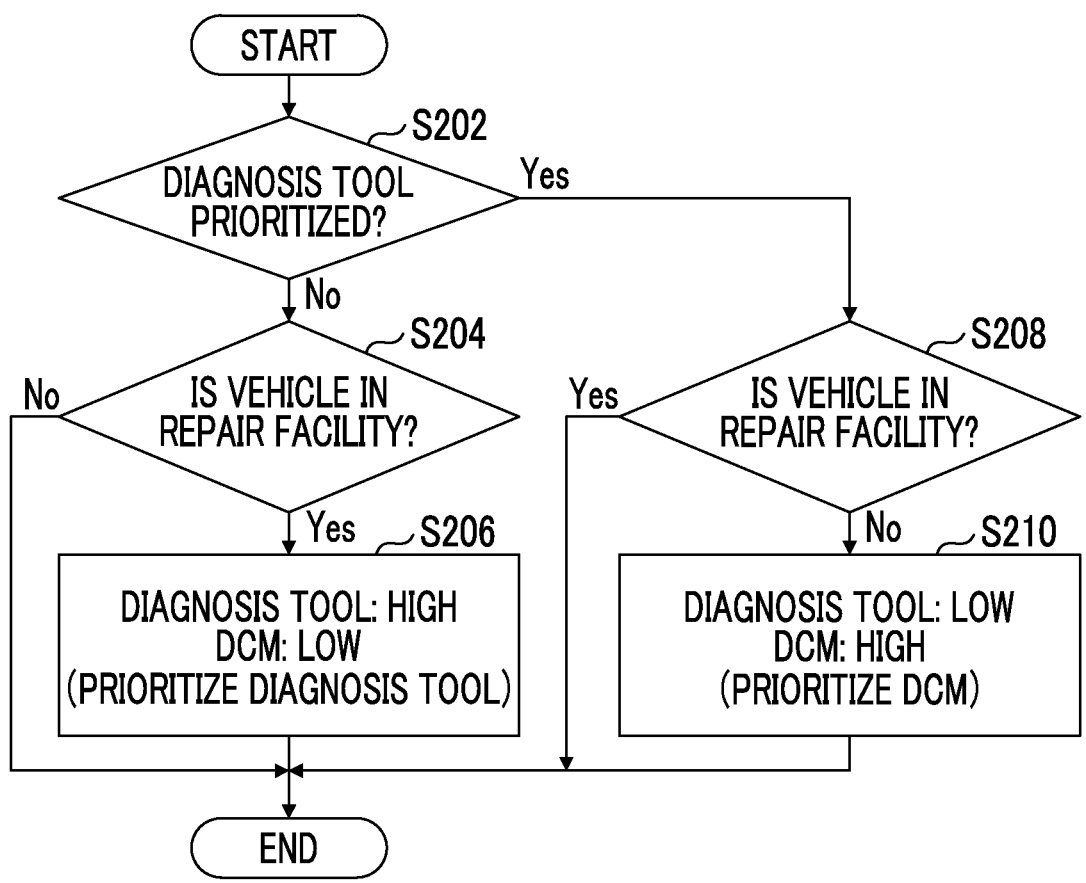
FIG. 5 is a flowchart schematically illustrating an example of a priority setting process in a gateway ECU (a priority setter) according to the second embodiment.

First, FIG. 5 is a flowchart schematically illustrating an example of the priority setting process in the priority setting processor 109 according to the embodiment. A process in the flowchart may be periodically executed, for example, during an operation of the gateway ECU 10 in which the priority setting processor 109 that is a processing target is included (for example, between IG-ON and IG-OFF of the vehicle 100).

Further, an initial state of the priority information 1101 at the above timing (the time of completion of the vehicle 100 or the time of IG-ON of the vehicle 100) is assumed that the diagnosis tool is prioritized in which the priority of the diagnosis tool 30 is higher than the priority of the DCM 40 (the priority of the diagnosis tool 30 is "high" and the priority of the DCM 40 is "low").

In step S202, the priority setting processor 109 determines whether or not the diagnosis tool is prioritized based on the content of the priority information 1101. The priority setting processor 109 proceeds to step S204 when the diagnosis tool is not prioritized (that is, the DCM is prioritized in which the priority of the DCM 40 is higher than the priority of the diagnosis tool 30), and proceeds to step S208 when the diagnosis tool is prioritized.

In step S204, the priority setting processor 109 determines whether or not the vehicle 100 is in a repair facility (for example, a dealer or a service factory). For example, the priority setting processor 109 may determine whether or not the vehicle 100 is in the repair facility based on position information and facility information of the vehicle 100 that can be acquired from a navigation device (a GPS sensor and a map database) of the vehicle 100. Further, for example, the priority setting processor 109 may determine whether or not the vehicle 100 is in the repair facility by confirming a connection situation between a communication device (for example, a Wi-Fi (Registered trademark) router) uniquely provided in the repair facility and a corresponding communication device provided in the vehicle 100. The priority setting processor 109 proceeds to step S206 when the vehicle 100 is in the repair facility, and ends the current process when the vehicle 100 is not in the repair facility.

In step S206, the priority setting processor 109 sets and changes the priority information 1101 to prioritize the diagnosis tool, that is, sets and changes the priority of the diagnosis tool 30 to "high" and the DCM 40 to "low", and ends the current process.

On the other hand, in step S208, the priority setting processor 109 determines whether or not the vehicle 100 is in a repair facility. The priority setting processor 109 proceeds to step S210 when the vehicle 100 is not in the repair facility, and ends the current process when the vehicle 100 is in the repair facility.

In step S210, the priority setting processor 109 sets and changes the priority information 1101 to prioritize the DCM, that is, sets and changes the priority of the diagnosis tool 30 to "low" and the priority of the DCM 40 to "high", and ends the current process.

Thus, in the example, the priority setting processor 109 sets the priority information 1101 to prioritize the diagnosis tool in a case where the vehicle 100 is in a repair facility, and sets the priority information 1101 to prioritize the DCM in a case where the vehicle 100 is not in the repair facility. Therefore, in a case where the vehicle 100 is in the repair facility, since the diagnosis tool 30 is highly likely to be used for inspection and repair as described above, an arbitration process of prioritize the diagnosis tool and setting the gateway ECU 10 (10B) to which the diagnosis tool 30 has been connected as the master to prioritize the response request from the diagnosis tool 30 as compared with the response request from the DCM 40, can be performed. On the other hand, when the vehicle 100 is not in the repair facility, since it is conceivable that the diagnosis tool 30 is less likely to be used for inspection and repair, an arbitration process of prioritize the DCM to prioritize the response request from the DCM 40 as compared with the response request from the diagnosis tool 30 can be performed.

Figure 6:
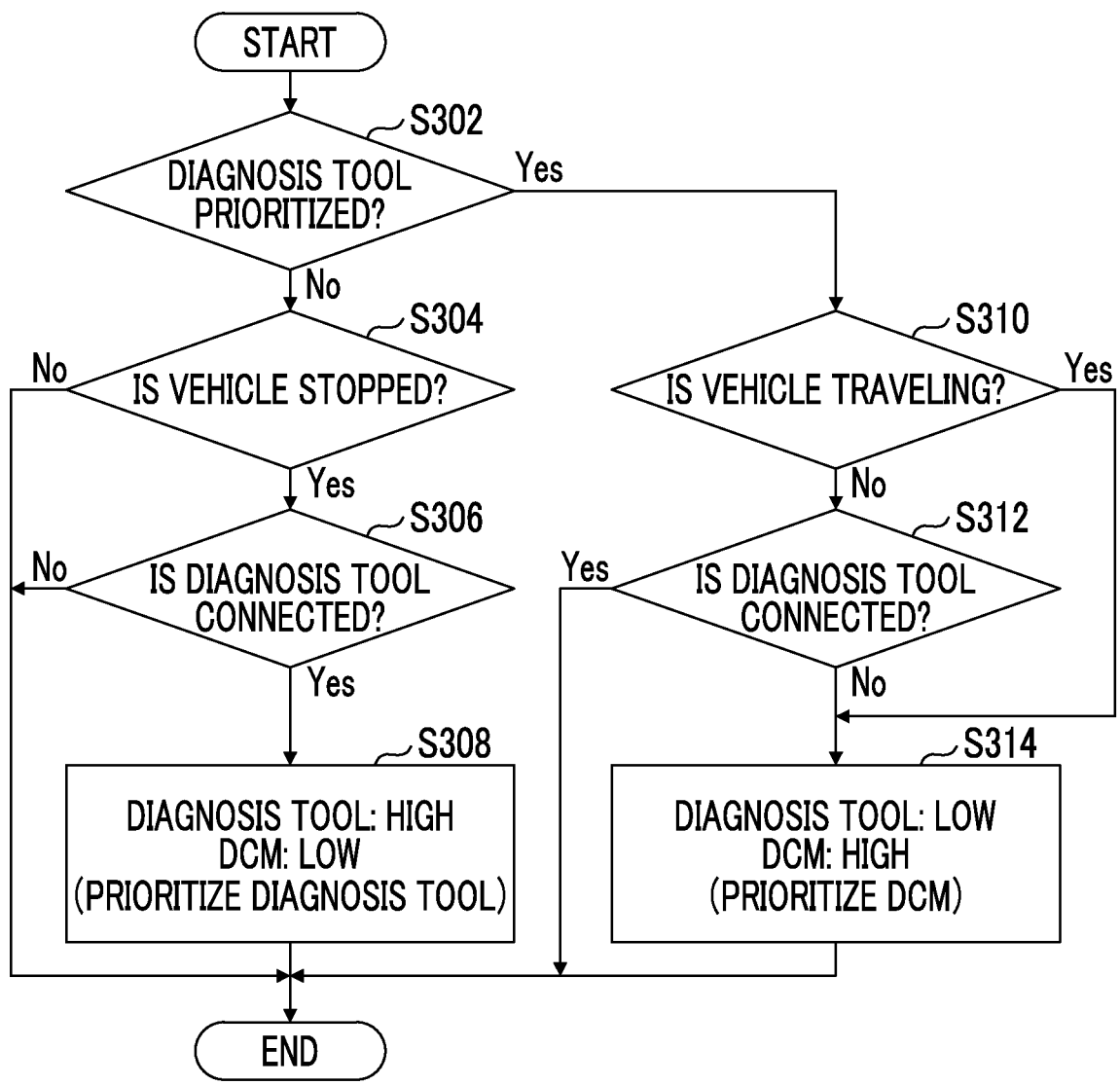
FIG. 6 is a flowchart schematically illustrating another example of the priority setting processing in the gateway ECU (the priority setter) according to the second embodiment.

Subsequently, FIG. 6 is a flowchart schematically illustrating another example of the priority setting process in the priority setting processor 109 according to the embodiment. A process in the flowchart may be periodically executed, for example, during an operation of the gateway ECU 10 in which the priority setting processor 109 that is a processing target is included (for example, between IG-ON and IG-OFF of the vehicle 100), similar to the case of FIG. 5.

In step S302, the priority setting processor 109 determines whether or not the diagnosis tool is prioritized based on the content of the priority information 1101. The priority setting processor 109 proceeds to step S304 when the diagnosis tool is not prioritized (that is, the DCM is prioritized), and proceeds to step S310 when the diagnosis tool is prioritized.

In step S304, the priority setting processor 109 determines whether or not the vehicle 100 is stopped. The priority setting processor 109 can determine whether or not the vehicle 100 is stopped or is traveling, for example, based on a detection signal that can be acquired from a vehicle speed sensor (not illustrated) mounted on the vehicle 100. The priority setting processor 109 proceeds to step S306 when the vehicle 100 is stopped, and ends the current process when the vehicle 100 does not stop (that is, the vehicle 100 is traveling).

In step S306, the priority setting processor 109 determines whether or not the diagnosis tool 30 is connected to any one (the gateway ECU 10B in the embodiment) of the gateway ECUs 10. The priority setting processor 109 proceeds to step S308 when the diagnosis tool 30 is connected to any one of the gateway ECUs 10, and ends the current process when the diagnosis tool 30 is not connected to any one of the gateway ECUs 10.

In the case of the example, the first transmission processor 101 (101B) may transmit connection information indicating that the request device (the diagnosis tool 30) is connected to the gateway ECU 10 (10B) in which the first transmission processor 101 itself is included, to all the gateway ECUs 10 (the gateway ECUs 10A, 10C). Accordingly, the priority setting processor 109 of all the gateway ECUs 10 can determine whether or not the diagnosis tool 30 is connected.

In step S308, the priority setting processor 109 sets and changes the priority information 1101 to prioritize the diagnosis tool, that is, sets and changes the priority of the diagnosis tool 30 to "high" and the priority of the DCM 40 to "low", and ends the current process.

On the other hand, in step S310, the priority setting processor 109 determines whether or not the vehicle 100 is traveling. The priority setting processor 109 proceeds to step S312 when the vehicle 100 is not traveling (that is, the vehicle 100 is stopped) and proceeds to step S314 when the vehicle 100 is traveling.

In step S314, the priority setting processor 109 determines whether or not the diagnosis tool 30 is connected to any one (the gateway ECU 10B in the embodiment) of the gateway ECUs 10. The priority setting processor 109 proceeds to step S314 when the diagnosis tool 30 has not been connected to any one of the gateway ECUs 10, and ends the current process when the diagnosis tool 30 is connected to any one of the gateway ECUs 10.

In step S314, the priority setting processor 109 sets and changes the priority information 1101 to prioritize the DCM, that is, sets and changes the priority of the diagnosis tool 30 to "low" and the priority of the DCM 40 to "high", and ends the current process.

Thus, in the example, the priority setting processor 109 sets the priority information 1101 to prioritize the diagnosis tool when the vehicle 100 is stopped and the diagnosis tool 30 is connected to any one of the gateway ECUs 10. This is because it is conceivable that inspection and repair of the vehicle 100 are highly likely to be performed when the vehicle 100 is stopped and the diagnosis tool 30 is connected to the vehicle 100. On the other hand, the priority setting processor 109 sets the priority information 1101 to prioritize the DCM when the vehicle 100 is traveling or when the diagnosis tool 30 has not been connected to any of the gateway ECUs 10. This is because it is conceivable that inspection and repair of the vehicle 100 are less likely to be performed when the vehicle 100 is traveling or when the diagnosis tool 30 has not been connected to the vehicle 100.

Subsequently, FIG. 7 is a flowchart schematically illustrating yet another example of the priority setting process in the priority setting processor 109 according to the embodiment. A process in the flowchart may be periodically executed, for example, during an operation of the gateway ECU 10 in which the priority setting processor 109 that is a processing target is included (for example, between IG-ON and IG-OFF of the vehicle 100), similar to the cases of FIGS. 5 and 6.

A process of steps S404 to S412 is the same as the process of steps S202 to S210 in FIG. 5. Hereinafter, a difference from the process of FIG. 5 will be described.

In step S402, the priority setting processor 109 determines whether or not an abnormality (failure) has occurred in the vehicle 100. The priority setting processor 109 can determine whether or not an abnormality has occurred in the vehicle 100, for example, based on diagnosis information which can be acquired from various ECUs including the ECU 20 mounted on the vehicle 100. The abnormality of the vehicle 100 includes, for example, a state in which detection values of various sensors mounted on the vehicle 100 are out of predefined normal ranges. Specifically, examples of the detection values of various sensors include a measurement value of a coolant temperature sensor of an engine, and a detection value of a current sensor that detects a current of a motor that drives the vehicle. When an abnormality (failure) has not occurred in the vehicle 100, the priority setting processor 109 proceeds to step S404 and performs the same process as in FIG. 5. On the other hand, when an abnormality (failure) has occurred in the vehicle 100, the priority setting processor 109 proceeds to step S414.

In step S414, the priority setting processor 109 determines whether or not the diagnosis tool is prioritized based on the content of the priority information 1101. When the diagnosis tool is not prioritized (that is, the DCM is prioritized), the priority setting processor 109 proceeds to step S408, sets and changes the priority information 1101 to prioritized the diagnosis tool, that is, sets and changes the priority of the diagnosis tool 30 to "high" and the priority of the DCM 40 to "low", and ends the current process. On the other hand, when the diagnosis tool is prioritized, the priority setting processor 109 ends the current process.

Although the processes of steps S402, 414 are added to the processes (steps S202 to S210) of FIG. 5 in the embodiment, the processes of steps S402, 414 may be similarly added to the processes (steps S302 to S314) of FIG. 6. In this case, when a result of step S414 is No, the process proceeds to the process corresponding to step S308.

Thus, in the example, the priority setting processor 109 sets and changes the priority of the request devices (the diagnosis tool 30, the DCM 40) according to a predetermined condition when an abnormality has not occurred in the vehicle 100, and sets the priority of the diagnosis tool 30 to be higher than the priority of the DCM 40 regardless of the predetermined condition of the vehicle 100 when the abnormality has occurred in the vehicle 100. Thus, it is possible to change the priority of the request devices according to a position or a state of the vehicle 100, and it is possible to set the priority of the diagnosis tool 30 that is used for repair and inspection of the vehicle 100 to be the highest in a situation in which the vehicle 100 is broken down and the repair of the vehicle 100 is needed.

Next, a specific process flow in the master setting processor 107 according to the embodiment will be described with reference to FIG. 8.

FIG. 8 is a flowchart schematically illustrating an example of the master setting process in the master setting processor 107 according to the disclosure. A process in the flowchart may be periodically executed, for example, during an operation of the gateway ECU 10 in which the master setting processor 107 that is a processing target is included (for example, between IG-ON and IG-OFF of the vehicle 100), similar to FIG. 3.

The processes of S502 to S520 in the flowchart are the same as those of steps S102 to S120 in FIG. 3. Hereinafter, the differences will be mainly described.

In step S512, when the master setting processor 107 determines that the first reception processor 102 has not received the connection information indicating that the request device is connected, from the gateway ECU 10 other than the gateway ECU 10 in which the master setting processor 107 itself is included, the master setting processor 107 proceeds to step S522.

In step S522, the master setting processor 107 determines whether or not the priority information 1101 is set and changed by the priority setting processor 109 of the gateway ECU 10 in which the master setting processor 107 itself is included. The master setting processor 107 proceeds to step S524 when the priority information 1101 is set and changed by the priority setting processor 109, and ends the current process when the priority information 1101 has not been set and changed by the priority setting processor 109.

In step S524, the master setting processor 107 determines whether or not the master flag F is "2", that is, whether or not the gateway ECU 10 in which the master setting processor 107 itself is included is set as the master. The master setting processor 107 proceeds to step S514 and performs setting of the master when the master flag F is "2", and ends the current process when the master flag F is not "2" (the master flag F is "1").

Thus, in the embodiment, when the gateway ECU 10 in which the master setting processor 107 itself is included is set as the master, the master setting processor 107 performs selection (setting) of the master from among the gateway ECUs 10 (the gateway ECUs 10A to 10C) when the priority information 1101 is set and changed. Thus, the gateway ECU 10 that is set as the master can be appropriately changed according to the priority information 1101 set and changed by the priority setting processor 109.

The embodiments of the disclosure have been described above in detail, but the disclosure is not limited to such specific embodiments, and various modifications or changes can be made without departing from the scope of the gist of the disclosure described in the claims.

First Modification Example

For example, although the master setting processor 107 and the priority information 1101 are included in all of the gateway ECUs 10 (10A to 10C) in the above-described embodiments, the master setting processor 107 and the priority information 1101 may be provided in one gateway ECU 10 among the gateway ECUs 10. In this case, the first reception processor 102 (an example of a third receiver) of the one gateway ECU 10 receives the connection information regarding the connected request device from the gateway ECU 10 other than the one gateway ECU 10. Further, when the master is set by the master setting processor 107, the first transmission processor 101 (an example of a third transmitter) of the one gateway ECU 10 transmits master information regarding the gateway ECU 10 set as the master to the other gateway ECU 10. Further, the first transmission processor 101 (an example of a fourth transmitter) of the other gateway ECU 10 transmits the connection information regarding connected request device to the one gateway ECU 10 in a case where any one of the request devices is connected to the gateway ECU 10 in which the first transmission processor 101 itself is included. Further, the first reception processor 102 (an example of a fourth receiver) of the other gateway ECU 10 receives the master information that is transmitted from one gateway ECU 10. In such a configuration, the same operation and effects as those of the embodiment described above are achieved.

Second Modification Example

Further, although the master setting processor 107 and the priority information 1101 are included in the gateway ECUs 10 in the above-described embodiments, the master setting processor 107 and the priority information 1101 may be included in an external device that is mounted on the vehicle 100 and can communicate with the gateway ECUs 10 (the gateway ECUs 10A to 10C). In this case, the external device includes a reception processor (an example of a fifth receiver) that receives connection information regarding the connected request device from each of the gateway ECUs 10, and a transmission processor (an example of a fifth transmitter) that transmits master information regarding the gateway ECU 10 set as the master to each of the gateway ECUs 10 when the master is set by the master setting processor 107. Further, each of the gateway ECUs 10 (the gateway ECUs 10A to 10C) includes a fourth transmission processor (an example of a sixth transmitter) that transmits connection information regarding the connected request device to the external device when any one of a plurality of request devices is connected to the gateway ECU 10 in which the one of the request devices itself is included, and a fourth reception processor (an example of a sixth receiver) that receives master information that is transmitted from the external device. In such a configuration, the same operation and effects as those of the embodiment described above are achieved.

Third Modification Example

Further, although the priority of the diagnosis tool 30 among the priorities defined in the priority information 1101 is set to be higher than the priority of the DCM 40 in the first embodiment and the modification example thereof described above, the setting may be reversed in a case where the response request from the center server 200 is prioritized.

Fourth Modification Example

Further, although the priority setting processor 109 is provided in all of the gateway ECUs 10 (10A to 10C) in the second embodiment and the modification example thereof described above, the priority setting processor 109 may be provided in any one of the gateway ECUs. In this case, the gateway ECU 10 (the first transmission processor 101) provided with the priority setting processor 109 transmits the priority information 1101 set and changed by the priority setting processor 109 to the other gateway ECU 10. Accordingly, the priority information 1101 of the other gateway ECU 10 is also updated. In such a configuration, the same operation and effects as those in the above-described embodiment are achieved.

Fifth Modification Example

Further, although the priority setting processor 109 is provided in the gateway ECU 10 in the second embodiment and the modification example thereof described above, the priority setting processor 109 may be included in an external device that can communicate with the gateway ECUs 10 (the gateway ECUs 10A to 10C) that is mounted on the vehicle 100. In this case, the external device provided with the priority setting processor 109 transmits the priority information 1101 set and changed by the priority setting processor 109 to the gateway ECUs 10 (the gateway ECUs 10A to 10C). Accordingly, the priority information 1101 of the gateway ECUs 10 (the gateway ECUs 10A to 10C) is updated. In such a configuration, the same operation and effects as those of the embodiment described above are achieved.

Sixth Modification Example

Further, although the master setting processor 107 sets the master based on the connection situation (connection his-tory) between the request devices and the gateway ECUs 10 from the present to the past after the predefined timing (the time of completion of the vehicle 100 or the time of IG-ON of the vehicle 100) in the embodiments and the modification examples described above, the master setting processor 107 may set the master based on a current connection situation. Specifically, the master setting processor 107 may set, as the master, the gateway ECU 10 to which the request device having the highest priority is connected among the gateway ECUs 10 to which any one of the request devices is actually connected. In such a configuration, the same operation and effects as those of the embodiments and the modification examples described above are achieved.

What is claimed is:

1. An in-vehicle network system mounted on a vehicle, the in-vehicle network system comprising
a plurality of gateway electronic control units comprising a CPU, a RAM, a ROM, and an I/O, the plurality of gateway electronic control units being configured to communicate with each other and being configured such that one of a plurality of vehicle electronic control units comprising a CPU, a RAM, a ROM, and an I/O is connected to at least one of the plurality of gateway electronic control units, and each of a plurality of request devices is connected to any predefined one of the plurality of gateway electronic control units, the plurality of the request devices being configured to transmit a response request to the one of the plurality of vehicle electronic control units, wherein
at least one of the plurality of gateway electronic control units is configured to
store priority information indicating a priority in an arbitration process for the response request transmitted from each of the plurality of the request devices,
set, as a master, the one of the plurality of gateway electronic control units to which one of the plurality of the request devices having the highest priority in the arbitration process for the response request transmitted from the each of the plurality of the request devices has been connected among the plurality of gateway electronic control units to which any one of the request devices has been connected after a predefined timing, or the one of the plurality of gateway electronic control units to which the one of the plurality of the request devices having the highest priority in the arbitration process for the response request transmitted from the each of the plurality of the request devices is connected among the plurality of gateway electronic control units to which any one of the request devices is connected, and
perform arbitration such that the response request transmitted from the one of the plurality of the request devices having the highest priority in the arbitration process is preferentially transmitted to the one of the plurality of vehicle electronic control units when the response requests are transmitted from at least two of the plurality of the request devices when the one of the plurality of gateway electronic control units is set as the master, and
each of the plurality of gateway electronic control units is further configured to
transmit master information indicating the one of the plurality of gateway electronic control units set as the master to other of the plurality of gateway electronic control units other than the one of the plurality of gateway electronic control units when the master is set, receive the master information transmitted from the other of the plurality of gateway electronic control units other than the one of the plurality of gateway electronic control units, transmit connection information regarding the connected request device to other of the plurality of gateway electronic control units other than the one of the plurality of gateway electronic control units when any one of the request devices is connected to the one of the plurality of gateway electronic control units, receive the connection information transmitted from the other of the plurality of gateway electronic control units other than the one of the plurality of gateway electronic control units, set the one of the plurality of gateway electronic control units as a master when any one of the request devices is connected to the one of the plurality of gateway electronic control units when the master is not set, and set, as the master, the one of the plurality of gateway electronic control units to which the request device having the highest priority has been connected among the plurality of gateway electronic control units to which any one of the request devices has been connected after the predefined timing, or the one of the plurality of gateway electronic control units to which the request device having the highest priority is connected among the plurality of gateway electronic control units to which any one of the request devices is actually connected, when any one of the request devices is connected to the plurality of gateway electronic control units not set as the master and when the one of the plurality of gateway electronic control units is set as the master.

2. The in-vehicle network system according to claim 1, wherein the at least one of the plurality of gateway electronic control units is further configured to transmit a command signal to command blocking of communication with the request devices other than the request device connected to the one of the plurality of gateway electronic control units to the one of the plurality of gateway electronic control units not set as the master when the response request is transmitted from the request device connected to the one of the plurality of gateway electronic control units when the one of the plurality of gateway electronic control units is set as the master.

3. The in-vehicle network system according to claim 1, wherein
the request devices include
an external connection device that is connectable to any one of the plurality of gateway electronic control units, and
a communication device that is configured to communicate with a server that outputs the response request directed to the control device, and
the priority of the external connection device included in the priority information is set to be higher than the priority of the communication device.

4. The in-vehicle network system according to claim 1, wherein the plurality of gateway electronic control units are further configured to set and change the priority of each of the request devices included in the priority information according to a predetermined condition.

5. The in-vehicle network system according to claim 4, wherein the plurality of gateway electronic control units are further configured to set, as the master, the one of the plurality of gateway electronic control units to which the request device having the highest priority has been connected among the plurality of gateway electronic control units to which any one of the request devices has been connected after the timing, or the one of the plurality of gateway electronic control units to which the request device having the highest priority is connected among the plurality of gateway electronic control units to which any one of the request devices is connected, when the priority of each of the request devices is changed when the master is set.

6. The in-vehicle network system according to claim 4, wherein
the request devices include
an external connection device that is connectable to any one of the plurality of gateway electronic control units, and
a communication device that is configured to communicate with a server that outputs the response request directed to the at least one of vehicle electronic control units; and
the at least one of the plurality of gateway electronic control units is further configured to set the priority of the external connection device to be higher than the priority of the communication device when the at least one of the plurality of gateway electronic control units determines that the vehicle is in a repair facility, and set the priority of the communication device to be higher than the priority of the external connection device when the at least one of the plurality of gateway electronic control units determines that the vehicle is not in the repair facility.

7. The in-vehicle network system according to claim 4, wherein
the request devices include
an external connection device that is connectable to any one of the plurality of gateway electronic control units, and
a communication device that is configured to communicate with a server that outputs the response request directed to the at least one of vehicle electronic control units; and
the at least one of the plurality of gateway electronic control units is further configured to set the priority of the external connection device to be higher than the priority of the communication device when the vehicle is stopped and the external connection device is connected to any one of the plurality of gateway electronic control units, and set the priority of the communication device to be higher than the priority of the external connection device when the vehicle is traveling or the external connection device is not connected to any one of the plurality of gateway electronic control units.

8. The in-vehicle network system according to claim 7, wherein
the request devices include an external connection device that is connectable to any one of the plurality of gateway electronic control units; and
the at least one of the plurality of gateway electronic control units is further configured to set the priority of the external connection device to be the highest regardless of the predetermined condition when the priority setter determines that an abnormality has occurred in the vehicle.

9. The in-vehicle network system according to claim 1, wherein the predefined timing is a time of completion of the vehicle or a time of IG-ON of the vehicle.

10. An in-vehicle network system mounted on a vehicle, the in-vehicle network system comprising
a plurality of gateway electronic control units comprising a CPU, a RAM, a ROM, and an I/O, the plurality of gateway electronic control units being configured to communicate with each other and being configured such that one of a plurality of vehicle electronic control units comprising a CPU, a RAM, a ROM, and an I/O is connected to at least one of the plurality of gateway electronic control units, and each of a plurality of request devices is connected to any predefined one of the plurality of gateway electronic control units, the plurality of the request devices being configured to transmit a response request to the one of the plurality of vehicle electronic control units, wherein
at least one of the plurality of gateway electronic control units is configured to
store priority information indicating a priority in an arbitration process for of the response request transmitted from each of the plurality of the request devices,
set, as a master, the one of the plurality of gateway electronic control units to which one of the plurality of the request devices having the highest priority in the arbitration process for the response request transmitted from the each of the plurality of the request devices has been connected among the plurality of gateway electronic control units to which any one of the request devices has been connected after a predefined timing, or the one of the plurality of gateway electronic control units to which the one of the plurality of the request devices having the highest priority in the arbitration process for the response request transmitted from the each of the plurality of the request devices is connected among the plurality of gateway electronic control units to which any one of the request devices is connected,
perform arbitration such that the response request transmitted from the one of the plurality of the request devices having the highest priority in the arbitration process is preferentially transmitted to the one of the plurality of vehicle electronic control units when the response requests are transmitted from at least two of the plurality of the request devices when the one of the plurality of gateway electronic control units is set as the master,
receive connection information regarding the connected request device from other of the plurality of gateway electronic control units other than the one of the plurality of gateway electronic control units, and
transmit master information regarding the one of the plurality of gateway electronic control units set as the master to the other of the plurality of gateway electronic control units other than the one of the plurality of gateway electronic control units when the master is set, and
each of the other of the plurality of gateway electronic control units other than the at least one of the plurality of gateway electronic control units is further configured to
transmit the connection information regarding the connected request device to the one of the plurality of gateway electronic control units when any one of the plurality of the request devices is connected to the one of the plurality of gateway electronic control units,
receive the master information that is transmitted from the one of the plurality of gateway electronic control units,
set, as the master, the one of the plurality of gateway electronic control units to which the request device is connected when any one of the plurality of the request devices is connected to any one of the plurality of gateway electronic control units when the master is not set, and
set, as the master, the one of the plurality of gateway electronic control units to which the request device having the highest priority has been connected among the plurality of gateway electronic control units to which any one of the request devices has been connected after the predefined timing, or the one of the plurality of gateway electronic control units to which the request device having the highest priority is connected among the plurality of gateway electronic control units to which any one of the request devices is connected, when any one of the request devices is connected to the plurality of gateway electronic control units not set as the master when the master is set.

11. The in-vehicle network system according to claim 10, wherein the at least one of the plurality of gateway electronic control units is further configured to transmit a command signal to command blocking of communication with the request devices other than the request device connected to the one of the plurality of gateway electronic control units to the one of the plurality of gateway electronic control units not set as the master when the response request is transmitted from the request device connected to the one of the plurality of gateway electronic control units when the one of the plurality of gateway electronic control units is set as the master.

12. The in-vehicle network system according to claim 10, wherein
the request devices include
an external connection device that is connectable to any one of the plurality of gateway electronic control units, and
a communication device that is configured to communicate with a server that outputs the response request directed to the control device, and
the priority of the external connection device included in the priority information is set to be higher than the priority of the communication device.

13. The in-vehicle network system according to claim 10, wherein the plurality of gateway electronic control units are further configured to set and change the priority of each of the request devices included in the priority information according to a predetermined condition.

14. The in-vehicle network system according to claim 10, wherein the predefined timing is a time of completion of the vehicle or a time of IG-ON of the vehicle.

15. An in-vehicle network system mounted on a vehicle, the in-vehicle network system comprising
a plurality of gateway electronic control units comprising a CPU, a RAM, a ROM, and an I/O, the plurality of gateway electronic control units being configured to communicate with each other and being configured such that one of a plurality of vehicle electronic control units comprising a CPU, a RAM, a ROM, and an I/O is connected to at least one of the plurality of gateway electronic control units, and each of a plurality of request devices is connected to any predefined one of the plurality of gateway electronic control units, the plurality of the request devices being configured to transmit a response request to the one of the plurality of vehicle electronic control units, wherein at least one of the plurality of gateway electronic control units is configured to store priority information indicating a priority in an arbitration process for of the response request transmitted from each of the plurality of the request devices, set, as a master, the one of the plurality of gateway electronic control units to which one of the plurality of the request devices having the highest priority in the arbitration process for the response request transmitted from the each of the plurality of the request devices has been connected among the plurality of gateway electronic control units to which any one of the request devices has been connected after a predefined timing, or the one of the plurality of gateway electronic control units to which the one of the plurality of the request devices having the highest priority in the arbitration process for the response request transmitted from the each of the plurality of the request devices is connected among the plurality of gateway electronic control units to which any one of the request devices is connected, and perform arbitration such that the response request transmitted from the one of the plurality of the request devices having the highest priority in the arbitration process is preferentially transmitted to the one of the plurality of vehicle electronic control units when the response requests are transmitted from at least two of the plurality of the request devices when the one of the plurality of gateway electronic control units is set as the master, and an external device that is mounted on the vehicle and communicates with the plurality of gateway electronic control units, the external device is configured to receive connection information regarding the connected request device from each of the plurality of gateway electronic control units, and transmit master information regarding the one of plurality of gateway electronic control units set as the master to each of the plurality of gateway electronic control units when the master is set, and each of the plurality of gateway electronic control units is further configured to transmit the connection information regarding the connected request device to the external device when any one of the request devices is connected to the one of plurality of gateway electronic control units, receive the master information that is transmitted from the external device, set, as the master, the one of plurality of gateway electronic control units to which the request device is connected when any one of the request devices is connected to any one of the plurality of gateway electronic control units when the master is not set, and set, as the master, the one of plurality of gateway electronic control units to which the request device having the highest priority has been connected among the plurality of gateway electronic control units to which any one of the request devices has been connected after the predefined timing, or the one of plurality of gateway electronic control units to which the request device having the highest priority is connected among the plurality of gateway electronic control units to which any one of the request devices is connected, when any one of the request devices is connected to the plurality of gateway electronic control units not set as the master when the master is set.

16. The in-vehicle network system according to claim 15, wherein the at least one of the plurality of gateway electronic control units is further configured to transmit a command signal to command blocking of communication with the request devices other than the request device connected to the one of the plurality of gateway electronic control units to the one of the plurality of gateway electronic control units not set as the master when the response request is transmitted from the request device connected to the one of the plurality of gateway electronic control units when the one of the plurality of gateway electronic control units is set as the master.

17. The in-vehicle network system according to claim 15, wherein the request devices include an external connection device that is connectable to any one of the plurality of gateway electronic control units, and a communication device that is configured to communicate with a server that outputs the response request directed to the control device, and the priority of the external connection device included in the priority information is set to be higher than the priority of the communication device.

18. The in-vehicle network system according to claim 15, wherein the plurality of gateway electronic control units are further configured to set and change the priority of each of the request devices included in the priority information according to a predetermined condition.

19. The in-vehicle network system according to claim 15, wherein the predefined timing is a time of completion of the vehicle or a time of IG-ON of the vehicle.

* * * * *